INVENTOR.
ROBERT E. BARBOUR
JOHN BRADEN
BY
Jack N. Wicks
ATTORNEY

INVENTOR.
ROBERT E. BARBOUR
JOHN BRADEN
BY
Jack N. Wicks
ATTORNEY

United States Patent Office 3,241,441
Patented Mar. 22, 1966

3,241,441
DEVICE AND METHOD FOR CONTROLLING EXPOSURE IN A PHOTOGRAPHIC COLOR PRINTER
Robert E. Barbour and John Braden, Minneapolis, Minn., assignors to Pako Corporation, Minneapolis, Minn.
Filed May 25, 1959, Ser. No. 815,695
5 Claims. (Cl. 88—24)

Our invention relates broadly to an improvement in a photographic color printer. It relates more particularly to a printer device having means for changing the color of the light during the exposure, and adjusting the amount of exposure of a given color to the requirements of the particular negative being printed.

The exposure referred to above is received by photo color-sensitive material sensitive in three regions of the spectrum, for example the three primary colors, red, green and blue.

Broadly the use of a white light source to simultaneously expose the three photosensitive emulsions is known in the art, but due to variations in emulsion sensitivities and negative color content, the use of this single white light exposure usually results in an undesirable color tinge in the finished print. It is also known that correcting for undesirable color tinge may be done with a suitable filter to modify the white light during the entire exposure, but this necessitates making a test print for determining the necessary filter to be used during the entire exposure. A further means of obtaining a proper exposure is set forth in an application hereinafter referred to.

The present application is concerned with printing by use of white light followed by modification of this white light by filters to produce subsequent exposure to red, green or blue light or by subsequent change of the printing light source as required by the density and color balance of the negative being printed.

In color printing in order to control the color and density of the finished print, the light passing through the negative is measured by a device sensitive to image color and density and a device for accomplishing the same is described in application Serial No. 790,226, filed Jan. 30, 1959, now Patent No. 3,100,419, beginning at page 9 thereof. Briefly, such a light measuring or sampling device includes a beam splitter placed in the light stream so as to direct a portion of the light passing from the negative to a photosensitive cell with a series of three light analyzing filters interposed between the cell and the beam splitter. These filters are mounted on a driven revolving support which places each filter in the light stream for a portion of the revolution of the support. Connected to the shaft driving this support is a switch which connects the output of the photocell sequently to each of these timer circuits which measure the color sampled by the particular filter between the beam splitter and the photocell, the output of the photocell being proportional to the quantity of light of the color selected by the analyzing filter.

Each of the three timer circuits operates to receive the output of the photocell and produce an electrical output when a predetermined quantity of light of the particular color has been collected by the photocell.

During the exposure each of the three timer circuits will produce an electrical output at the time the sensitive material has received sufficient exposure to the color measured by this circuit. These three electrical output signals are then utilized to control the color of the light stream by placing light modifying or printing filters in the light stream.

In the referenced application the three measuring circuits measure red, green and blue light and their electrical outputs are used to control cyan, magenta and yellow light modifying filters, the cyan filter operating to terminate the red exposure by cutting off only red light, the magenta filter terminating the green exposure by cutting off only the green light and the yellow filter terminating the blue exposure by cutting off the blue light. This method of terminating the individual colors of a white light has been referred to as the "subtractive" method of color printing. Another method of color printing is referred to as the "additive" method which exposes the sensitive material sequentially to red, green and blue light.

The timer circuits above referred to contain means for predetermining the ratio of the exposure of each of the three colors to the others and also means for collectively modifying the exposure while maintaining the ratio. Certain of these modifying means are under the control of the operator for overriding the color and density control provided by the automatic actions of the timer circuit to compensate for unusual negative characteristics.

It is the object of our invention to use the output signal of each of the timer circuits in conjunction with means for producing a sequential exposure consisting of a white light followed by sequential colored light exposure or exposures, these being any of the three primary colors, red, green and blue. The aforementioned means controls the red, green and blue light content of the printing light according to the exposure required as dictated by the color balance of a particular negative.

We shall not here attempt to set forth and indicate all of the various objects and advantages incident to our invention, but other objects and advantages will be referred to in, or else will become apparent from, that which follows.

The invention will appear more clearly from the following detailed description when taken in connection with the accompanying drawings, showing by way of example preferred embodiments of the inventive idea wherein like numerals refer to like parts throughout.

In the drawings forming part of this application:

Figure 1:
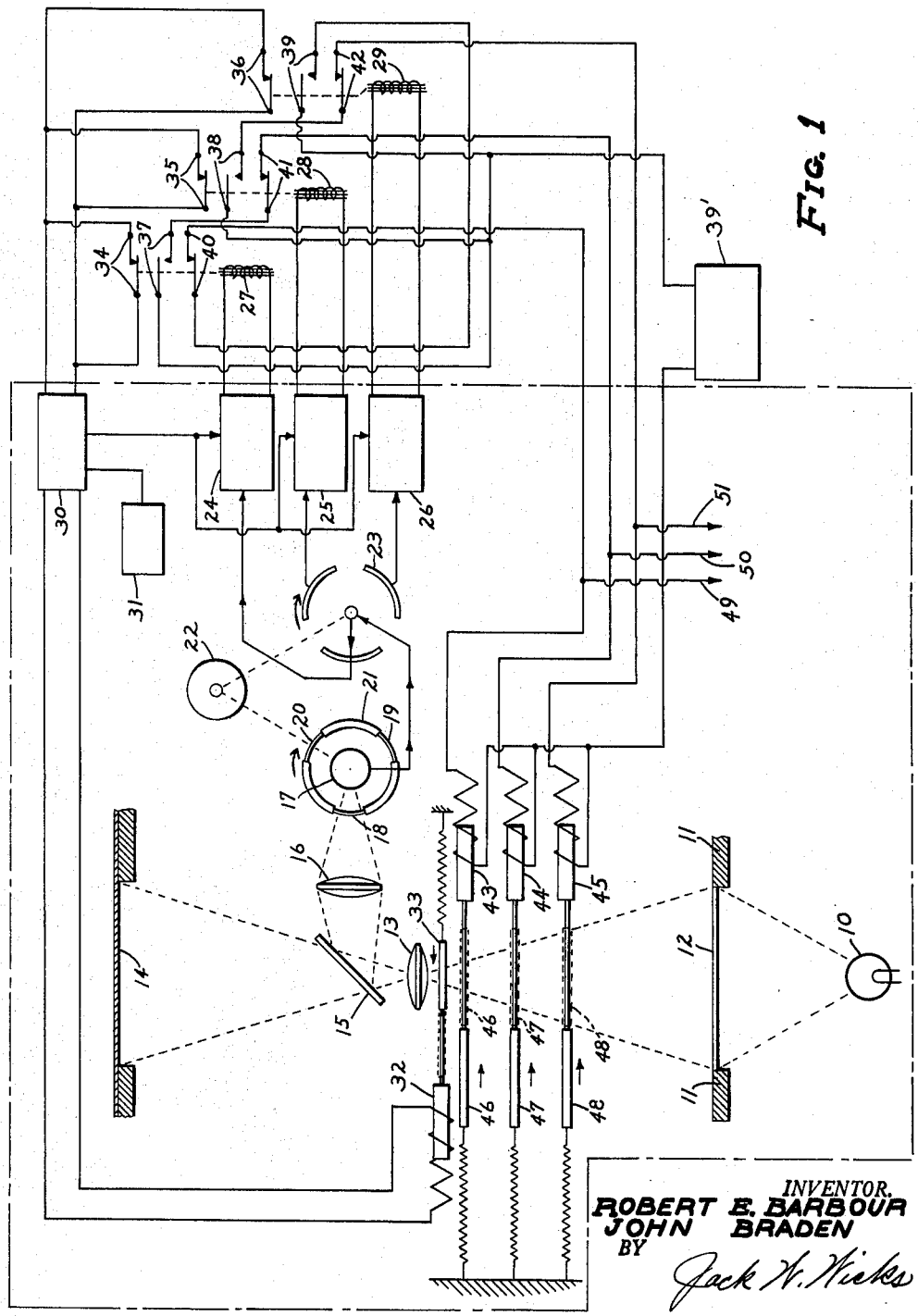
FIGURE 1 is a diagrammatic presentation of our invention.

Referring to FIGURE 1 of the drawing in detail, we will describe very briefly the operation of the devices contained within the area defined by the broken line block outline which is substantially that disclosed in detail in the aforementioned application with the exception of the red, green and blue filters hereinafter described. Included is the white light source 10 positioned below the negative holder 11 which supports the negative 12. Suitably supported above the negative holder 11 is the lens 13 which forms an image of the negative 12 on the sensitized material 14. A beam splitter 15 is positioned so that a portion of the light passing through the lens 13 is directed to the lens 16 which directs the sampled light to the cathode of the photosensitive cell 17 through light analyzing filters 18, 19 and 20 which are red, green and blue respectively. The filters 18, 19 and 20 are mounted in the cylindrical support 21 which is rotated about the photocell 17 by the motor 22. The motor 22 also drives the distributor 23 in step with the filter support 21. The distributor 23 connects the electrical output of cell 17 to each of the three timing circuits 24, 25 and 26, red timing circuit 24 being connected to the cell 17 during the time the red filter 18 is between the cell 17 and the beam splitter 15, the green timing circuit 25 being connected to cell 17 during the time the green filter 19 is between the cell 17 and the beam splitter 15, the blue timing circuit 26 being connected to the cell 17 during the time the blue filter 20 is between the cell 17 and the beam splitter 15.

The red timing circuit 24 provides an output signal to operate relay 27 while the green timing circuit 25 provides an output signal to operate relay 28 and likewise blue timing circuit 26 provides an output signal to operate relay 29. The detail and principle of operation of the timing circuits 24, 25 and 26 suitable for the purpose herein is described in the aforementioned application.

It might be well at this point to describe briefly the function of the cycle control 30 described in the aforementioned application. The exposure cycle is initiated by operation of start switch 31 which through relays in the control 30 supplies power to shutter solenoid 32 which removes opaque shutter 33 from the light stream and allows light to pass through the lens 13 to the sensitized material 14 and the cell 17. The exposure is terminated by signals from contacts 34, 35 and 36 of the relays 27, 28 and 29 respectively. All three normally closed contacts 34, 35 and 36 must be opened to provide end of cycle signal to control 30 and suitable detailed circuitry to accomplish this is found in the aforementioned application. We further provide contacts 37, 38 and 39 which connect a source of power 39' through contacts 40, 41 and 42 respectively to solenoids 43, 44 and 45, the return connection of solenoids 43, 44 and 45 being made to the other terminal of power source 39'. The solenoids place printing or light modifying filters 46, 47 and 48 respectively in the light stream emanating from the source 10 and said filters are red, green and blue respectively.

During an actual exposure the color content of the negative 12 may be such that any of the three timing circuits 24, 25 or 26 would produce an output first. Therefore any one of the three relays 27, 28 or 29 may be the first to operate. This enables a random selection of any of three printing filter sequences depending on the color balance of the negative 12. Depending on the color balance of the negative the exposure requirement for any of the three colors, red, green or blue may be satisfied during the white light exposure which is the first step in the exposure. This is followed by an additional sequential exposure of the remaining color or colors as required by the color balance of the particular negative.

A detailed operation of one complete exposure sequence is as follows: Assume that during the white light exposure the requirement for red exposure is first satisfied. As a result the red timing circuit 24 produces an output which operates relay 27 closing contacts 37 which connect power source 39' through normally closed contacts 41 to solenoid 44 which inserts green printing filter 47 for the next step of this sequence. This green light exposure will continue until the green exposure requirement has been satisfied and green timing circuit 25 has produced an output which operates relay 28 which, by opening normally closed contacts 41, removes power from solenoid 44 which in turn removes the green printing filter 47 from the light stream. With the operation of relay 28 power source 39' is connected through contacts 38 and contacts 42 to solenoid 45 which places the blue printing filter 48 in the light stream. This blue light exposure will continue until the blue timing circuit 26 has produced an output to operate relay 29 opening normally closed contacts 42 which removes power from solenoid 45 thereby removing the blue printing filter 48 from the light stream. With the operation of the relay 29 the contacts 36 open, and in conjunction with the contacts 34 and 35, which have remained open since operation of relays 27 and 28, signal control 30 to remove power from the solenoid 32 thereby placing the shutter 33 in closed position which terminates the exposure. As a result of the above relays 27, 28 and 29 are deenergized and timer circuits 24, 25 and 26 are reset for the next exposure, the detail operation of control 30 being described in the aforementioned application. This sequence has produced an exposure of white followed by green, followed by blue light from a negative of a color balance which produced a satisfaction of the red exposure requirement during the white light portion of the exposure.

In another possible sequence assume that during the white light exposure the requirement for green exposure is first satisfied. As a result the green timing circuit 25 produces an output which operates relay 28 closing contacts 38 which connect power source 39' through contacts 42 to solenoid 45 which inserts blue printing filter 48 for the next step of this sequence. This blue light exposure will continue until the blue exposure requirement has been satisfied and blue timing circuit 26 has produced an output which operates relay 29 which by opening contacts 42 removes power from solenoid 45 which in turn removes the blue printing filter 48 from the light stream. With the operation of relay 29 power source 39' is connected through contacts 39 and 40 to solenoid 43 which places the red printing filter 46 in the light stream. This red light exposure will continue until the red timing circuit 24 has produced an output to operate relay 27 opening contacts 40 which removes power from solenoid 43 thereby removing the red printing filter 46 from the light stream.

With the operation of relay 27 the contacts 34 open and in conjunction with the contacts 35 and 36, which have remained open since operation of relays 28 and 29, signal control 30 to remove power from the solenoid 32 thereby placing the shutter 33 in closed position which terminates the exposure. As a result of the above relays 27, 28 and 29 are deenergized and timer circuits 24, 25 and 26 are reset for the next exposure, the detailed operation of control 30 being described in the aforementioned application. This sequence has produced an exposure of white followed by blue light, followed by red light from a negative of a color balance which produced a satisfaction of the green exposure requirement during the white light portion of the exposure.

In the remaining sequence we assume that during the white light exposure the requirement for blue exposure is first satisfied. As a result the blue timing circuit 26 produces an output which operates relay 29 closing contacts 39 which connect power source 39' through contacts 40 to solenoid 43 which inserts red printing filter 46 for the next step of this sequence. This red light exposure will continue until the red exposure requirement has been satisfied and red timing circuit 24 has produced an output which operates relay 27 which by opening contacts 40 removes power from solenoid 43 which in turn removes the red printing filter 46 from the light stream. With the operation of the relay 27 power source 39' is connected through contacts 37 and contacts 41 to solenoid 44 which places the green printing filter 47 in the light stream. This green light exposure will continue until the green timing circuit 25 has produced an output to operate relay 28 opening contacts 41 which removes power from solenoid 44 thereby removing the green printing filter 47 from the light stream.

With the operation of relay 28 the contacts 35 open and in conjunction with the contacts 34 and 36, which have remained open since operation of relays 27 and 29, signal control 30 to remove power from solenoid 32 thereby placing the shutter 33 in closed position which terminates the exposure. As a result of the above the relays 27, 28 and 29 are deenergized and timer circuits 24, 25 and 26 are reset for the next exposure. The detailed operation of control 30 being described in the aforementioned application. This sequence has produced an exposure of white light followed by red, followed by green from a negative of a color balance which produced a satisfaction of the blue exposure requirement during the white light portion of the exposure.

It can be seen that by changing the interconnection of relays 27, 28 and 29 three other possible cycles could be produced and these are white, blue, green; white, green, red; and white, red, blue.

Figure 2:
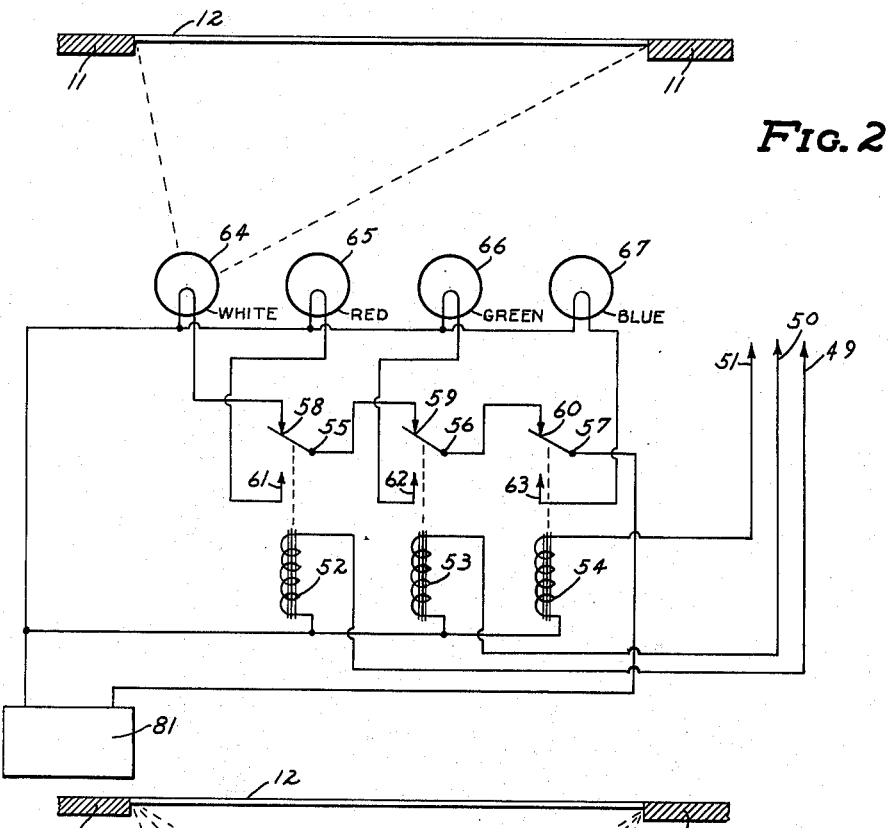
FIGURE 2 is a diagrammatic presentation of a further embodiment of our invention.

A further embodiment of our invention is shown in FIGURE 2 which includes four lamps 64, 65, 66 and 67 which are white, red, green and blue respectively, positioned below the negative 12 to replace light source 10 of FIGURE 1. Also included are the three relays 52, 53 and 54 connected to the circuitry of FIGURE 1 at lines indicated as 49, 50 and 51 which relays replace solenoids 43, 44 and 45 and their associated filters 46, 47 and 48 respectively. The relay 52 is connected so as to be energized during the same portion of the previously described cycle of operation that solenoid 43 was energized, the relay 53 connected so as to be energized during the portion of this cycle when solenoid 44 was energized, and the relay 54 being connected so as to be energized during the portion of this cycle when solenoid 45 was energized. These relays 52, 53 and 54 now operate when the colors red, green and blue respectively are required, relay 52 operating when red printing light is required, relay 53 operating when green printing light is required, and relay 54 operating when blue printing light is required.

The movable contacts 55, 56 and 57 of relays 52, 53 and 54 respectively supply power from source 81 to lamps 64, 65, 66 and 67 in the following manner: During the initial white light portion of the exposure from the lamp 64 none of the relays 52, 53 and 54 are energized, and power is supplied from source 81 through contacts 57 and 60 of relay 54 to contacts 56 and 59 of relay 53 to contacts 55 and 58 of relay 52 and then to white printing lamp 64. Lamp 64 remains energized until any one of the relays 52, 53 and 54 is operated by timers 24, 25 and 26 respectively of FIGURE 1. When relay 52 is energized the white lamp 64 is deenergized by opening contacts 55 and 58 and red lamp 65 is energized by closing contacts 55 and 61. When relay 53 is energized the white lamp 64 is deenergized by opening contacts 56 and 59 and green lamp 66 is energized by closing contacts 56 and 62. When relay 54 is energized the white lamp 64 is deenergized by opening contacts 57 and 60 and blue lamp 67 is energized by closing contacts 57 and 63.

It can be seen that this combination of relays and lamps as diagrammed in FIGURE 2 will produce a change in the color of the printing light to perform in a manner similar to the apparatus previously described which employs the solenoid operated filters described. The other details of the cycle of operation are identical to the previously described system. The four lamps 64, 65, 66 and 67 are positioned in a manner so as to each illuminate the negative over its entire area with reasonably constant energy over this area which may be done in several ways including suitable optical systems associated with each lamp to provide this ability.

Figure 3:
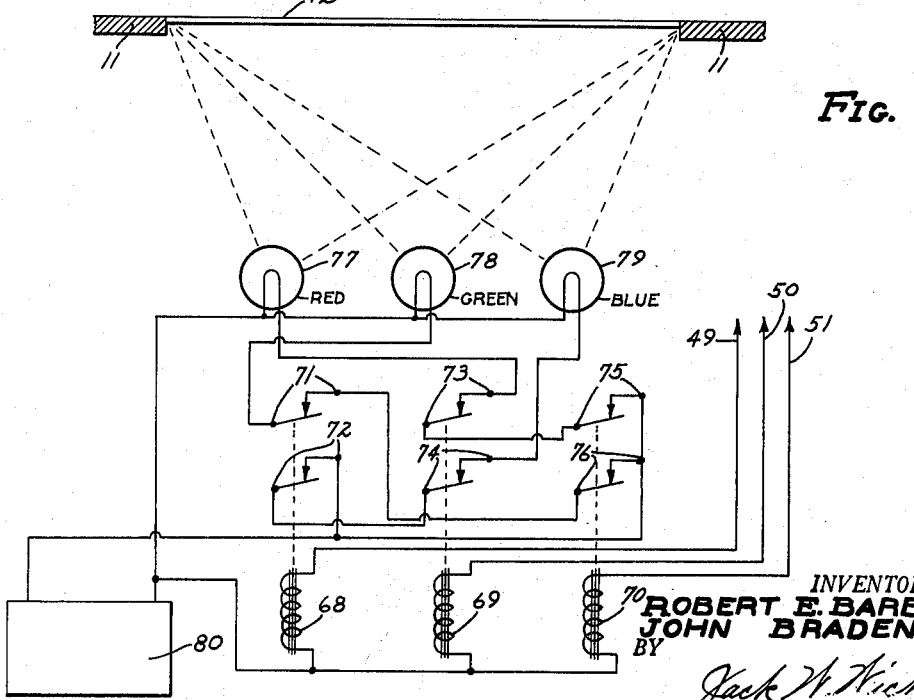
FIGURE 3 is a diagrammatic presentation of a still further embodiment of our invention.

A still further embodiment of our present invention is illustrated in FIGURE 3 which includes three lamps, a red lamp 77, a green lamp 78 and a blue lamp 79 positioned below the negative 12 to replace light source 10 of FIGURE 1. We further provide the three relays 68, 69 and 70 connected to the circuitry of FIGURE 1 at lines 49, 50 and 51, said relays replacing solenoids 43, 44 and 45 and their associated filters 46, 47 and 48 respectively. The relay 68 is connected so as to be energized during the same portion of the previously described cycle of operation when solenoid 43 was energized. The relay 69 is connected to be energized during the portion of the cycle when solenoid 44 was energized. The relay 70 is connected to be energized during the portion of the cycle when solenoid 45 was energized. These relays 68, 69 and 70 now operate when the colors red, green and blue are required, relay 68 operating when red printing light is required, relay 69 operating when green printing light is required, relay 70 operating when blue printing light is required. The white printing light required for the initial portion of the printing cycle is produced by simultaneous energization of the three lamps 77, 78 and 79, the mixture of their respective colors, red, green and blue producing a white light suitable for this application. During this initial white light exposure period the red printing light 77 is connected to power source 80 through normally closed contacts 73 on relay 69 and normally closed contacts 75 on relay 70, the green printing light 78 is connected to the power source 80 through normally closed contact 71 on relay 68 and normally closed contacts 76 on relay 70, and the blue printing light 79 is connected to power source 80 by normally closed contacts 74 of relay 69 and normally closed contacts 72 of relay 68. Thus all three lamps 77, 78 and 79 are simultaneously energized when relays 68, 69 and 70 are not energized which is the condition existing during the initial white light portion of the exposure.

When sufficient white light exposure is made to complete one color requirement, relays 68, 69 and 70 are each energized as the colors red, green and blue are required. The relay 68 operates to produce red light only by removing power from the green printing lamp 78 by opening the normally closed contacts 71 and also operating to remove power from blue printing light 79 by opening the normally closed contacts 72, the relay 69 operating to produce green light only by removing power from the red printing lamp 77 and the blue printing lamp 79 by opening normally closed contacts 73 and 74, the relay 70 operating to produce blue light only by removing power from the red printing lamp 77 and the green printing lamp 78 by opening normally closed contacts 75 and 76. Thus the apparatus of FIGURE 3 operates to provide white light by simultaneous energization of the red, green and blue printing lamps and to provide single primary color printing light by energizing only one of the lamps as required and which performs in a manner similar to the three solenoid-operated printing filters of FIGURE 1. The printing lamps 77, 78 and 79 are so positioned and provided with suitable optical devices so as to produce a homogeneous mixture of the colors at the negative for the initial white light exposure.

The invention is not to be understood as restricted to the details set forth since these may be modified within the scope of the appended claims without departing from the spirit and scope of the invention.

Having thus described the invention, what we claim as new and desire to secure by Letters Patent is:

1. In a photographic color printer, an exposure lamp for supplying white light through a negative onto photographic multicolor sensitive material, a shutter normally biased to closed position so as to block the passage of light from said lamp to said material, a solenoid for actuating said shutter into open position to simultaneously expose said material to the three primary colors red, green and blue contained in the white light supplied by said lamp, control means for energizing said shutter-actuating solenoid to initiate a white light exposure period when said control means is connected to a source of power, means for sampling the light impinging upon the material for furnishing respective electrical signals proportional to the sampled red light, the sampled green light, and the sampled blue light, a red timing circuit controlled by the electrical energy representing the sampled red light, a green timing circuit controlled by the electrical energy representing the sampled green light, a blue timing circuit controlled by the electrical energy representing the sampled blue light, each timing circuit generating an output signal when a predetermined exposure has occurred for the color with which it is associated, a relay connected to each timing circuit and energizable by an output signal from the circuit with which it is connected, each relay being provided with a set of normally open contacts and first and second sets of normally closed contacts, a red filter, a green filter and a blue filter, respective solenoids for inserting said filters one at a time into the path of light extending from said exposure lamp to said material, the solenoid for the red filter being in series with the first set of normally closed contacts of the relay connected to the red timing circuit and the normally open set of contacts of the relay connected to the blue timing circuit whereby closure of said last-mentioned contacts will energize the solenoid for the red filter if said red circuit relay is deenergized, the solenoid for the green filter being in series with the first set of normally closed contacts of the relay connected to the green timing circuit and the normally open set of contacts of the relay connected to the red timing circuit, whereby closure of said last-mentioned contacts will energize the solenoid for the green filter if said green circuit relay is deenergized, said solenoid for the blue filter being in series with the first set of normally closed contacts of the relay connected to the blue timing circuit and the normally open contacts of the relay connected to the green timing circuit, whereby closure of said last-mentioned contacts will energize the solenoid for the blue filter if said blue circuit relay is deenergized and said second sets of normally closed contacts all being parallel so as to disconnect said control means from said source of power after all of said relays have been energized, whereby said control means will in turn deenergize said shutter solenoid to block further transmission of light from said lamp source to said material.

2. In a photographic color printer having means for directing white light through a negative onto a photographic multicolor sensitive material for the purpose of simultaneously exposing said material to the three primary colors, red, green and blue, first, second and third means for determining when the exposure to any one of said primary colors has been substantially completed, said first determining means determining when said one primary color has been substantially completed, said second means determining when the exposure to a different primary color has been substantially completed, and said third means determining when the exposure to the still different primary color has been completed, a first relay responsive solely to said first determining means, a second relay responsive solely to said second determining means, a third relay responsive solely to said third determining means, interconnected contact means controlled by said three relays for subjecting said material to a single primary color printing light other than that for which exposure has been substantially completed when one of said determining means has determined that one of said primary colors has been substantially completed, said contact means precluding further exposure to said one primary color for which exposure has been substantially completed.

3. A printer in accordance with claim 2 in which said interconnected contact means also prevents further exposure to a second primary color for which exposure has been substantially completed.

4. A printer in accordance with claim 3 including a first, second and third solenoid in circuit with said contact means, said first solenoid when energized causing said material to be exposed to the primary color red, said second solenoid when energized causing said material to be exposed to the primary color green, and said third solenoid when energized causing said material to be exposed to the primary color blue.

5. In a photographic color printer, means for supplying white light through a negative onto photographic multicolor sensitive material, means for initiating a white light exposure period, means for sampling the light impinging upon the material for furnishing respective electrical signals proportional to sampled red light, sampled green light, and sampled blue light, a red timing circuit controlled by the electrical energy representing the sampled red light, a green timing circuit controlled by the electrical energy representing the sampled green light, a blue timing circuit controlled by the electrical energy representing the sampled blue light, each timing circuit generating an output signal when a predetermined exposure has occurred for the color with which it is associated, a relay connected to each timing circuit and energizable by an output signal from the circuit with which it is connected, each relay being provided with a set of normally open contacts and a set of normally closed contacts, a red color producing element, a green color producing element, and a blue color producing element, respective means for rendering said color producing elements operative one at a time, the rendering means for the red color producing element being in series with the normally closed contacts of the relay connected to the red timing circuit and the normally open set of contacts of the relay connected to the blue timing circuit, whereby closure of said last-mentioned contact will energize the rendering means for the red color producing element if said red circuit relay is de-energized, the rendering means for the green color producing element being in series with the set of normally closed contacts of the relay connected to the green timing circuit and the normally open set of contacts of the relay connected to the red timing circuit, whereby closure of said last-mentioned contacts will energize the rendering means for the green color producing element if said green circuit relay is de-energized, said rendering means for the blue color producing element bring in series with the set of normally closed contacts of the relay connected to the blue timing circuit and the normally open contacts of the relay connected to the green timing circuit, whereby closure of said last-mentioned contacts will energize the rendering means for the blue color producing element if said blue circuit relay is de-energized, and means operated by said relays after all have been energized for terminating the exposure period.

References Cited by the Examiner
UNITED STATES PATENTS

| | | | |
|---|---|---|---|
| 2,518,948 | 8/1950 | Simmon | 88—14 |
| 2,566,264 | 8/1951 | Tuttle et al. | 88—24 X |
| 2,742,837 | 4/1956 | Streiffert | 88—24 X |
| 2,997,389 | 8/1961 | Boon | 88—24 X |
| 3,002,425 | 10/1961 | Biedermann et al. | 88—24 |

OTHER REFERENCES 1,135,521  12/1956  France.

NORTON ANSHER, Primary Examiner.

EMIL G. ANDERSON, DAVID A. RUBIN, Examiners.